(12) United States Patent
Dickerson et al.

(10) Patent No.: US 7,531,044 B2
(45) Date of Patent: May 12, 2009

(54) GLASS WASHING MACHINE WITH BROKEN GLASS REMOVAL SYSTEM

(75) Inventors: Brett Robert Dickerson, Aurora, OH (US); Timothy Robert Hall, Streetsboro, OH (US); Robert R. Shepherd, II, Mogadore, OH (US); Diana Patricia Foltz, Akron, OH (US); Michael Steven Misura, Norton, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 61 days.

(21) Appl. No.: 11/586,159

(22) Filed: Oct. 25, 2006

(65) Prior Publication Data

US 2007/0034238 A1 Feb. 15, 2007

Related U.S. Application Data

(62) Division of application No. 10/375,557, filed on Feb. 26, 2003, now Pat. No. 7,137,164.

(60) Provisional application No. 60/365,608, filed on Mar. 18, 2002.

(51) Int. Cl.
B08B 7/04 (2006.01)
B08B 1/02 (2006.01)

(52) U.S. Cl. ............... 134/15; 134/6; 134/18; 15/77; 15/88.3; 15/102; 15/103.5

(58) Field of Classification Search ........... 134/15, 134/42, 6, 18; 15/77, 88.3, 102, 103.5; 65/27, 65/168, 268, DIG. 13
See application file for complete search history.

(56) References Cited

U.S. PATENT DOCUMENTS

| | | | | |
|---|---|---|---|---|
| 2,318,524 A | * | 5/1943 | Read | 210/297 |
| 3,449,781 A | * | 6/1969 | French et al. | 15/77 |
| 3,545,024 A | | 12/1970 | Randrup | |
| 4,756,321 A | * | 7/1988 | Livingston et al. | 134/56 D |
| 4,774,738 A | | 10/1988 | Lenhardt | |
| 5,406,665 A | | 4/1995 | Czopek | |
| 5,885,401 A | * | 3/1999 | Eiban | 156/344 |
| 6,018,842 A | | 2/2000 | Ayres | |
| 6,742,285 B2 | | 6/2004 | Shepherd | |

\* cited by examiner

*Primary Examiner*—Michael Barr
*Assistant Examiner*—Saeed T Chaudhry
(74) *Attorney, Agent, or Firm*—Taroll, Sundheim, Covell & Tummino LLP

(57) ABSTRACT

A glass sheet washing machine with a broken glass removal system includes a support, a liquid container or reservoir, a pump, a liquid applicator, and a liquid permeable member. The support supports a glass sheet being washed. The liquid reservoir is positioned below the support. The pump is coupled to the liquid reservoir. The liquid applicator is coupled to the pump. The liquid applicator applies the liquid from the liquid reservoir to wash the glass sheet. Excess liquid falls into the reservoir. The liquid permeable member is positioned between the support and the liquid reservoir to catch pieces of glass to inhibit the pieces of broken glass from falling into the liquid reservoir and is moved to remove the pieces from the glass washing machine.

20 Claims, 10 Drawing Sheets

GLASS WASHING MACHINE WITH BROKEN GLASS REMOVAL SYSTEM

CROSS REFERENCE TO RELATED APPLICATIONS

The present application is a divisional application claiming priority from U.S. patent application Ser. No. 10/375,557 having a filing date of Feb. 26, 2003, now U.S. Pat. No. 7,137,164 entitled "Glass Washing Machine with Broken Glass Removal System", which claims priority to the a U.S. Provisional application Ser. No. 60/365,608 having a filing date of Mar. 18, 2002. The present application claims priority to the aforementioned patents and patent applications, which are incorporated in their entirety herein by reference for all purposes.

TECHNICAL FIELD

The present invention relates generally to glass processing equipment and, in particular, to glass sheet washing machines.

BACKGROUND ART

Glass sheets or plates are used in the construction of a wide variety of items including doors, windows, furniture, mirrors and insulating glass units. Typically, a glass sheet or plate is mounted using an adhesive and/or a sealant. For an adhesive and/or a sealant to properly adhere to a glass sheet or plate, the glass sheet or plate must be clean. As a result, glass sheet washing machines have been developed.

Known glass sheet washing machines include a top row of brush rollers spaced apart from a bottom row of brush rollers. Sprayers spray a washing or rinsing liquid on each brush roller. A conveyor includes drive rollers positioned adjacent to brush rollers of each row. The glass sheets are passed through the conveyor with one large face up and one large face down. The top row of brush rollers acts on one large face of the glass and the bottom row acts on the other large face. Fluid reservoirs or containers are positioned below the conveyor and the brush rollers. Washing or rinsing fluid is pumped from the fluid reservoirs to the spray nozzles. Excess washing or rising sprayed onto the brush rollers re-enters the reservoir under the force of gravity to recycle the liquid.

It is common for glass sheets or plates being washed to break. When the glass sheet or plate breaks, broken pieces of glass fall into the fluid reservoirs. Typically, the operator of the glass washing machine will wait until the end of a production shift to remove the broken pieces of glass from the fluid reservoirs, so production is not interrupted. Presently, removal of the broken pieces of glass from the reservoirs is a difficult, time consuming, manual operation. The operator slides the reservoirs out from under the glass washing machine and "scoops" the broken pieces of glass out of the reservoirs with a shovel or net. A tray or pan can also be placed above the reservoirs to collect the broken glass. This requires dedicated floor space around the machine to be able to remove the trays.

What is needed is a system for inhibiting pieces of a broken sheet or plate of glass from falling into fluid reservoirs and easily removing the broken pieces from the glass washing machine.

DISCLOSURE OF INVENTION

The present disclosure concerns a glass sheet or plate washing machine. The disclosed washing machine includes a support, a liquid container or reservoir, a pump, a liquid applicator, and a glass catching web. The support supports a glass sheet being washed. The liquid reservoir is positioned below the support. The pump is coupled to the liquid reservoir. The liquid applicator is coupled to the pump. The pump provides liquid from the reservoir to the liquid applicator. The liquid applicator applies the liquid from the reservoir to the glass sheet to wash the glass sheet. An excess of the liquid falls back into the reservoir. The glass catching web is positioned between the support and the reservoir to catch pieces of broken glass when a glass sheet being washed breaks. The glass catching web inhibits pieces of broken glass from falling into the liquid reservoir.

In one embodiment, the glass catching web is a liquid permeable member. The glass catching web may be supported by first and second rotatable rolls. Rotation of the rolls moves the glass catching web to remove pieces of broken glass that have fallen onto the glass catching web.

In one embodiment, the glass catching web is connected at one end to one of the rotatable rolls and at a second end to the other rotatable roll. The rolls are rotated in one direction to move the glass catching web to remove broken pieces of glass. The rolls may then be rotated in an opposite direction to position the glass catching web to catch pieces of a subsequent glass sheet that breaks.

In an alternate embodiment, the glass catching web is in the form of a continuous belt. The belt is disposed around the first and second rotatable rolls. The rotatable rolls are rotated, moving the glass catching web to remove broken pieces of glass. The rotatable rolls may be constantly driven to continuously remove any pieces of broken glass that fall onto the glass catching web.

In one embodiment, the glass catching web is a rubber belt. In an alternate embodiment, the liquid permeable member is a wire mesh belt. A trough may be disposed below the glass catching web for receiving pieces of broken glass.

In one embodiment, the support is a conveyor that moves glass sheets or plates above the glass catching web. The liquid applicator may comprise a rotating brush and a spray nozzle. The rotating brush is positioned along a path of travel of the glass sheet. The rotating brush contacts the glass sheet as the glass sheet moves through the glass washing machine. The spray nozzle is positioned to spray liquid onto the rotating brush.

A method of inhibiting pieces of broken glass from entering a fluid reservoir of the glass sheet washing machine includes applying fluid to a glass sheet to wash the glass sheet. A glass catching web is placed between the glass sheet and a fluid reservoir of the glass washing machine. Excess fluid is communicated through or past the glass catching web to the reservoir. When a glass sheet breaks, pieces of broken glass are caught with the glass catching web to inhibit pieces from entering the fluid reservoir. The glass catching web is moved to remove pieces of broken glass.

BEST MODE FOR CARRYING OUT THE INVENTION

Figure 2:
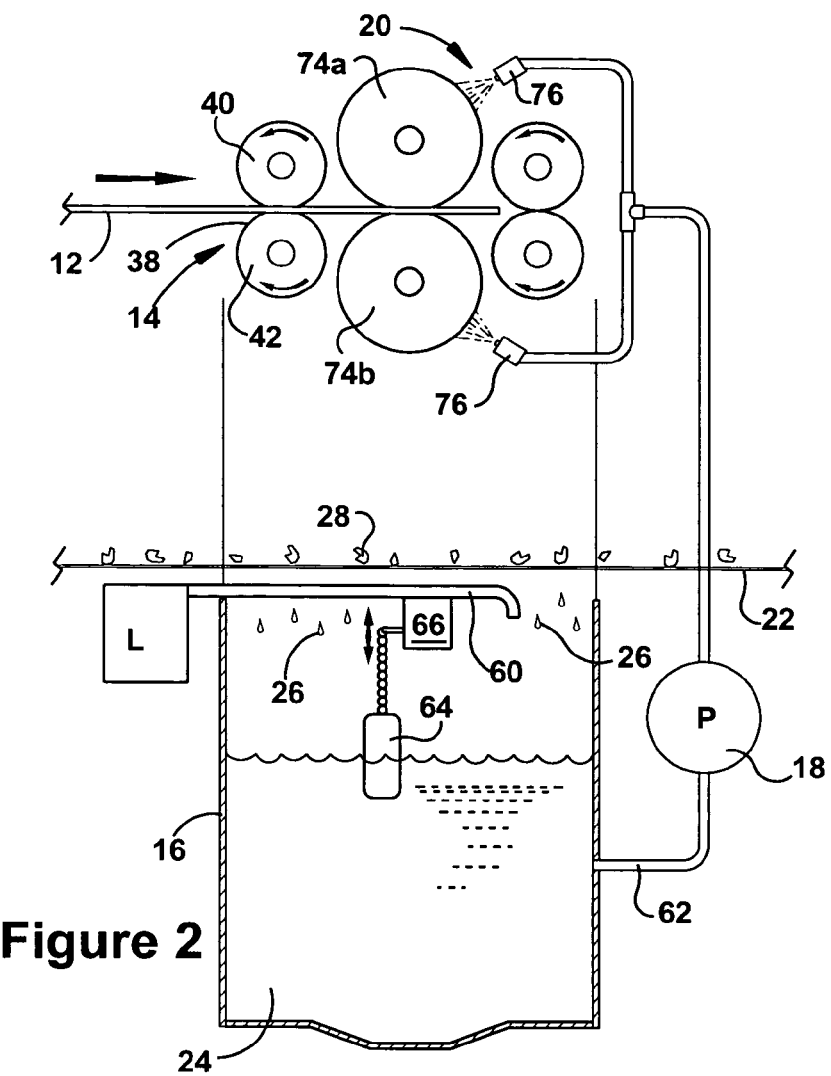
FIG. 2 is a schematic representation of one station of a glass washing machine with a broken glass removal system.

The present disclosure is directed to a glass sheet washing machine 10 for cleaning glass sheets 12 or plates. The washing machine 10 includes a support 14, a reservoir or container 16, a pump 18, a liquid applicator 20, and a glass catching web 22. In the illustrated embodiment, the glass catching web 22 is a liquid permeable member. Referring to FIG. 2, the support 14 supports a glass sheet 12 being washed. The liquid reservoir 16 is positioned below the support 14. The pump 18 is coupled to the liquid reservoir 16. The liquid applicator 20 is coupled to the pump 18. The pump 18 supplies a cleaning liquid 24 from the reservoir 16 to the applicator 20. The liquid applicator 20 applies the cleaning liquid 24 to the glass sheet 12 to wash the glass sheet 12. Excess liquid 26 falls back into the reservoir 16. The glass catching web 22 is positioned between the support 14 and the reservoir 16 to catch broken pieces of glass 28 when a glass sheet 12 being washed breaks. The glass catching web 22 inhibits the broken pieces 28 from entering the reservoir 16.

Figure 1:
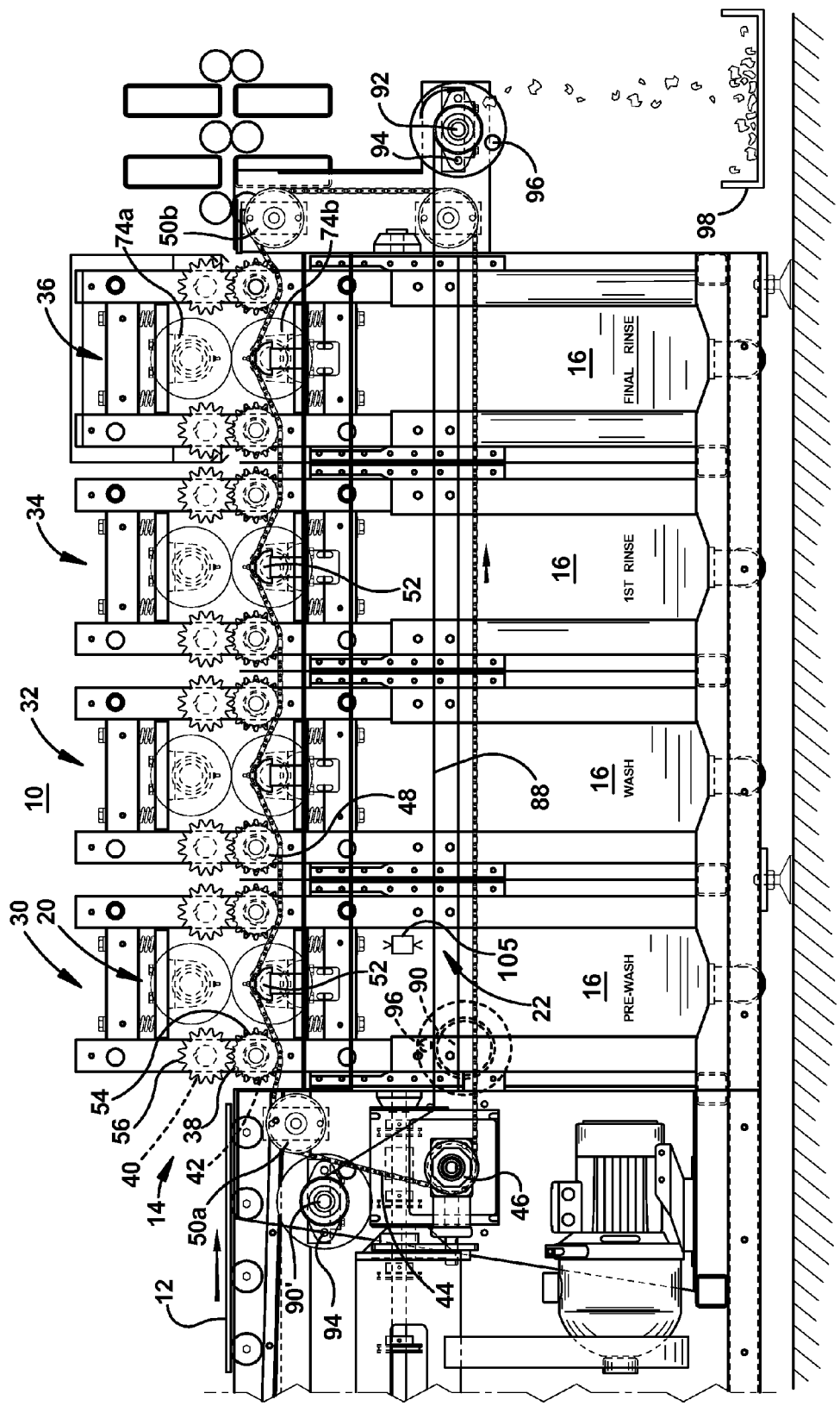
FIG. 1 is a side elevational view of a glass washing machine with a broken glass removal system.
Figure 3:
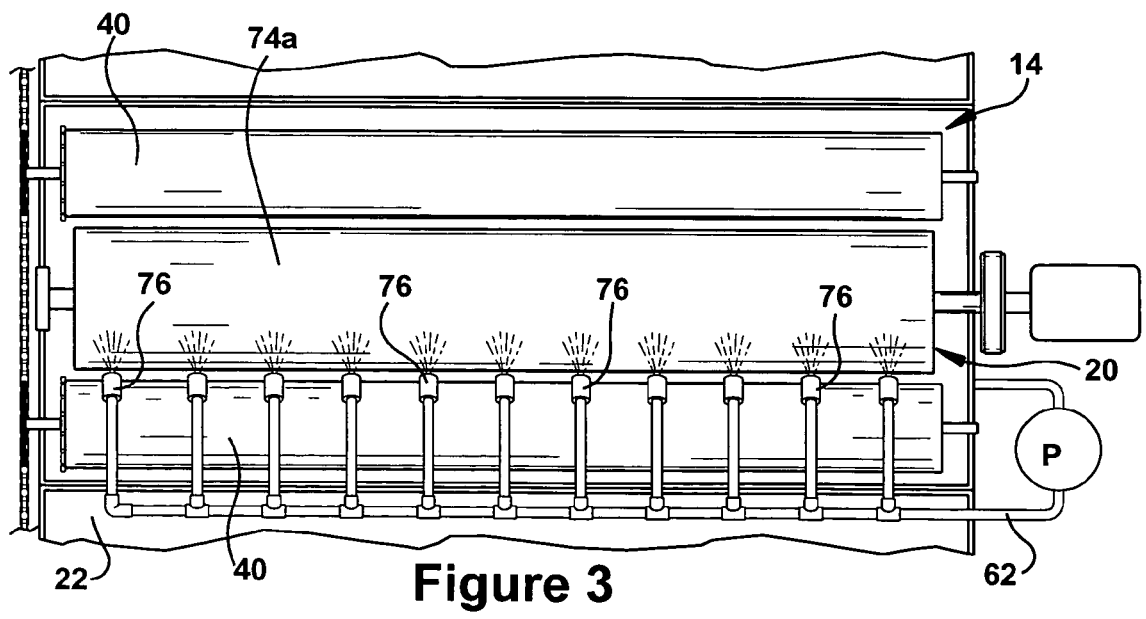
FIG. 3 is a top plan view of one station of a glass washing machine with a glass removal system.

Referring to FIG. 1, the illustrated glass washing machine includes a prewash station 30, a wash station 32, a first rinse station 34 and a final rinse station 36. Referring to FIGS. 1-3, in the illustrated embodiment, each station 30, 32, 34, 36 includes a support 14, a reservoir 16, a pump 18, and a liquid applicator 20. In the illustrated embodiment, a single glass catching web 22 is used in the glass sheet washing machine 10. The glass catching web 22 spans all four stations 30, 32, 34, 36 in the illustrated embodiment. The glass catching web 22 is positioned between the support 14 and the reservoir 16 of all four stations 30, 32, 34, 36.

Referring to FIGS. 1-4, the illustrated support 14 is a conveyor 38. The conveyor 38 includes an upper set of rollers 40 and a lower set of rollers 42. The rollers 40, 42 move the glass sheet 12 through the washing machine 10.

Figure 4:
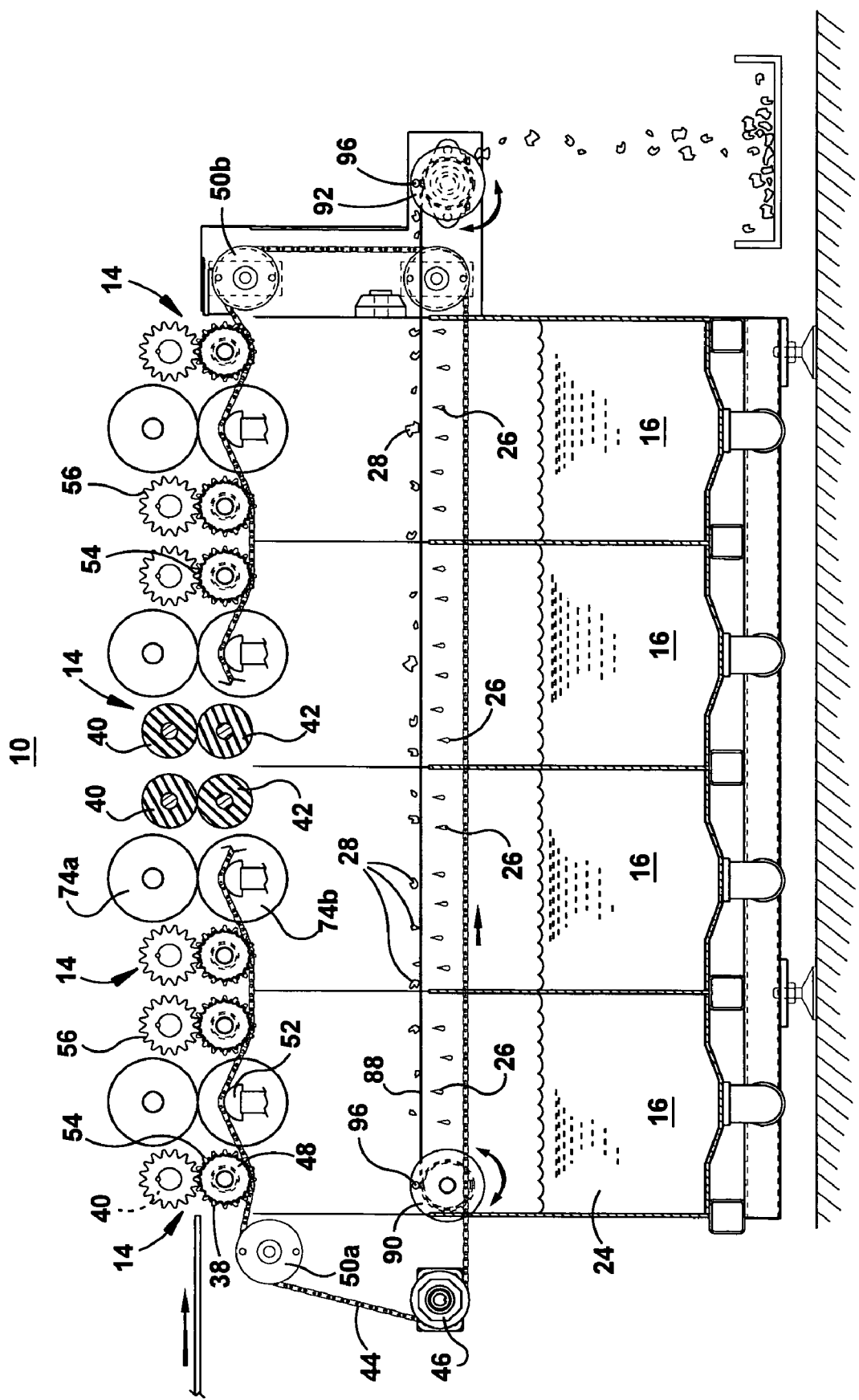
FIG. 4 is a schematic illustration of a conveyor drive in a glass washing machine with a broken glass removal system.
Figure 12:
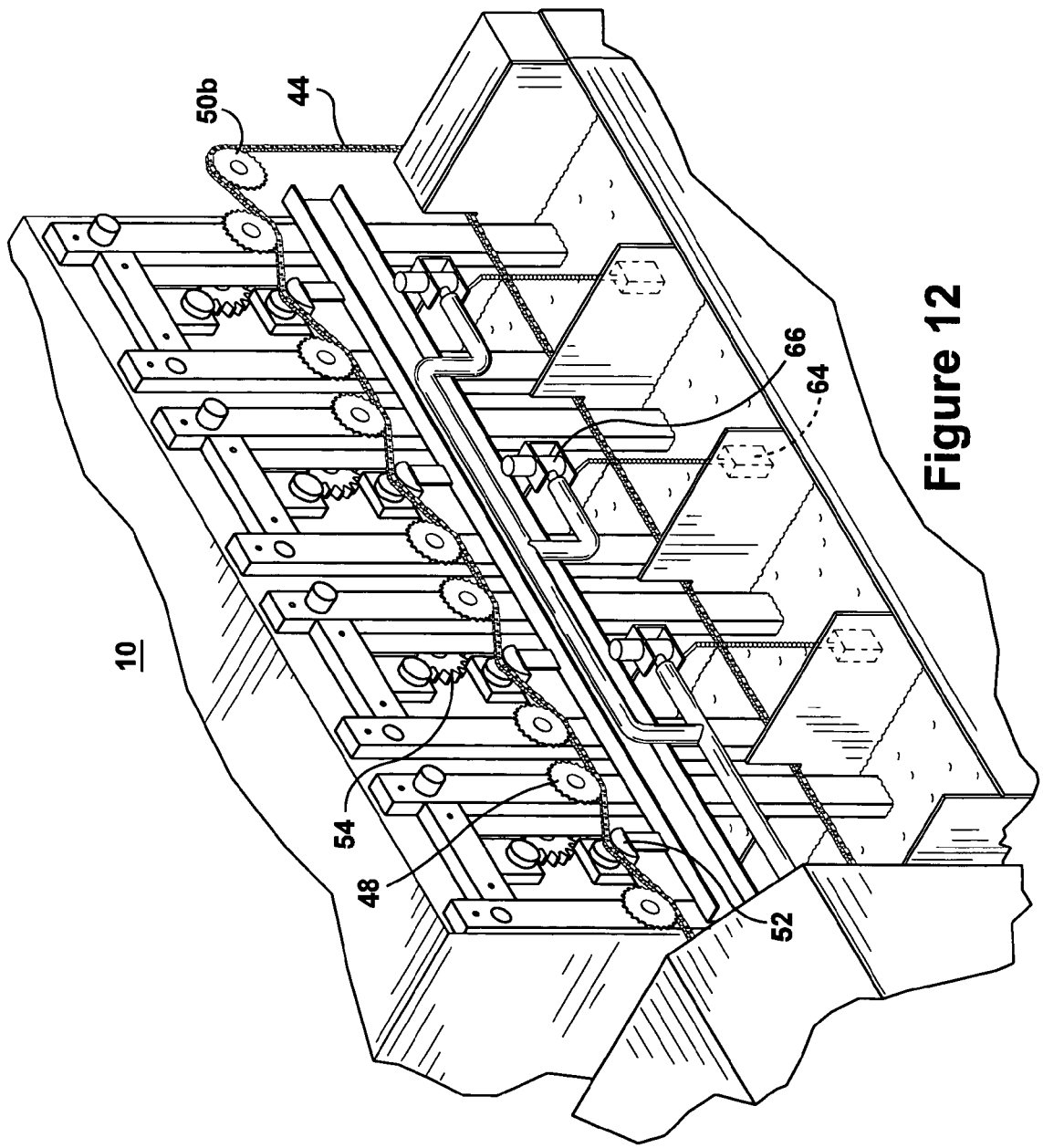
FIG. 12 depicts a drive train for rollers of a conveyor.
Figure 13:
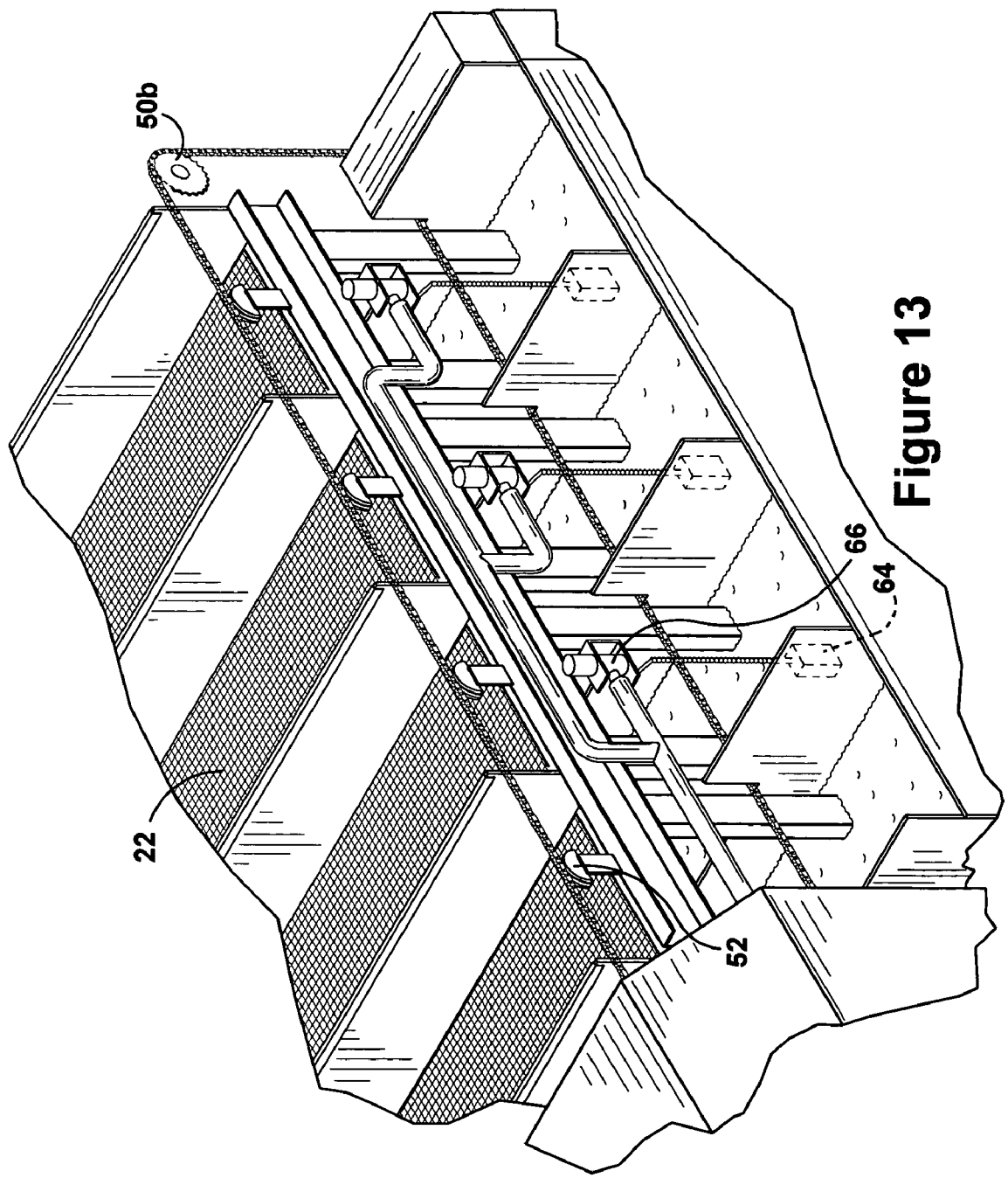
FIG. 13 illustrates a glass catching member positioned in a housing of a glass washing machine.

Referring to FIG. 4, the rollers 40, 42 are driven by a chain 44 coupled to a conveyor motor 46. In the illustrated embodiment, the rollers 40, 42 for all four stations 30, 32, 34, 36 are driven by a single chain and a single conveyor motor. The chain 44 engages a gear 48 on each of the lower rollers 42 (see FIGS. 4 and 12). The chain 44 is maintained in engagement with gears 48 on each of the lower rollers 42 by idler gears 50a, 50b and tensioning guides 52. Each lower roller 42 includes a second gear 54 positioned inward of the gear 48. Each of the upper rollers 40 include a gear 56 that meshes the second gear 54 of each lower roller 42. The conveyor motor 46 moves the chain 44 along the path illustrated in FIG. 4 to rotate each of the lower rollers 42. The second gear 54 on each lower roller 42 engages the gear 56 on each upper roller to rotate the upper roller 40. Glass placed in the conveyor 38 is moved through the washing machine 10 by the rollers 40, 42.

Figure 6:
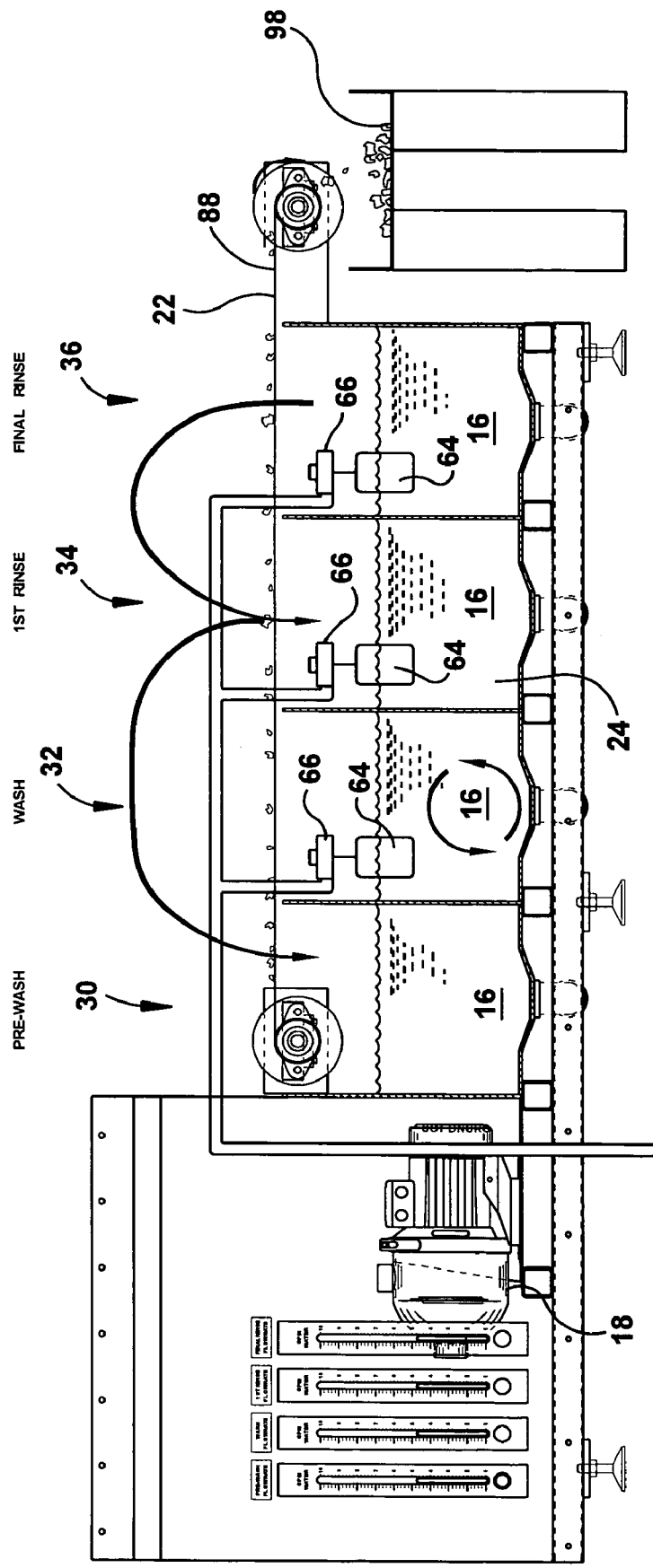
FIG. 6 is a schematic representation of reservoirs of a glass washing machine.

Referring to FIGS. 2 and 6, each station 30, 32, 34, 36 includes its own reservoir 16. Each reservoir 16 includes the cleaning liquid 24 that is applied to the glass sheet in the station that the reservoir is a part of. In the illustrated embodiment, the reservoirs 16 of the prewash station 30, the first rinse station 34 and the final rinse station 36 contain water. The reservoir 16 in the wash station 32 contains a solution of water and a detergent. Each reservoir 16 includes an inlet 60 and an outlet 62. The inlet 60 provides cleaning fluid 24 to the reservoir 16. The outlet 62 is in communication with the pump 18 that supplies the cleaning liquid 24 to the liquid applicator 76.

Referring to FIG. 2, the reservoir 16 includes a float 64 that regulates the liquid level in the reservoir 16. As cleaning liquid 24 is removed from the reservoir, the float 64 moves downward. When the float reaches a threshold level a valve 66 opens the inlet 60 to add cleaning liquid 24 to the reservoir. As cleaning liquid is added, the float 64 moves upward. When the float reaches a threshold value, the valve 66 closes to stop flow of fluid 24 into the reservoir 16.

Referring to FIG. 6, the inlet 60 and spray nozzles of the final rinse station 36 is coupled to a source of clean water, such as a tap 68. Clean tap water fills the reservoir 16 of the final rinse station 36, first rinse station 34 and wash station 32. The water from the final rinse reservoir 16 is recycled into the first rinse station nozzles as glass sheets are washed. The water from the first rinse reservoir 16 is recycled into the pre wash station nozzles as glass sheets are washed. The water in the wash reservoir 16 is recycled into the wash station nozzles as glass sheets are washed. In the illustrated embodiment, water is provided to the reservoir of the first rinse station nozzles from the final rinse station 36. A pump 18 provides water from the reservoir 16 of the final rinse station 36 to the inlet 60 of the first rinse station 34. Similarly, the reservoir of the pre-wash station 30 is filled with water from the first rinse station 34. A pump 18 provides water from the first rinse station 34 to the pre-wash station 30. In this manner, water is cycled through the final rinse station 36, then the first rinse station 34 and finally the pre-wash station 30. As should be apparent, the most clean water is contained in the reservoir of the final rinse station 36, slightly less clean water is contained in the reservoir 16 of the first rinse station 34 and less clean water is contained in the reservoir 16 of the pre-wash station 30. The cleaning liquid 24 used in the wash station is not provided to the reservoirs of the other stations, because this liquid contains detergent and is heated.

Referring to FIG. 2, the pump 18 is coupled to the reservoir 16 in each station 32, 34, 36. In the illustrated embodiment, the liquid applicator 20 comprises an upper rotating brush 74a, a lower rotating brush 74b and spray nozzles 76. The rotating brushes 74a, 74b are positioned along a path of travel defined by the conveyor 38. The rotating brushes 74a, 74b contact the glass sheets as they are moved through the washing machine 10 by the conveyor 38. The pump 18 provides cleaning liquid 24 to the spray nozzles 76. The spray nozzles 76 spray the cleaning liquid 24 onto the rotating brushes. Referring to FIGS. 2 and 3, a first plurality of spray nozzles 76 are positioned to spray cleaning liquid 24 along substantially the entire length of an upper rotating brush 74a. Likewise, an array of spray nozzles 76 is positioned to spray cleaning liquid 24 onto a lower brush 74b along substantially the entire length of the lower rotating brush 74b.

Figure 5:
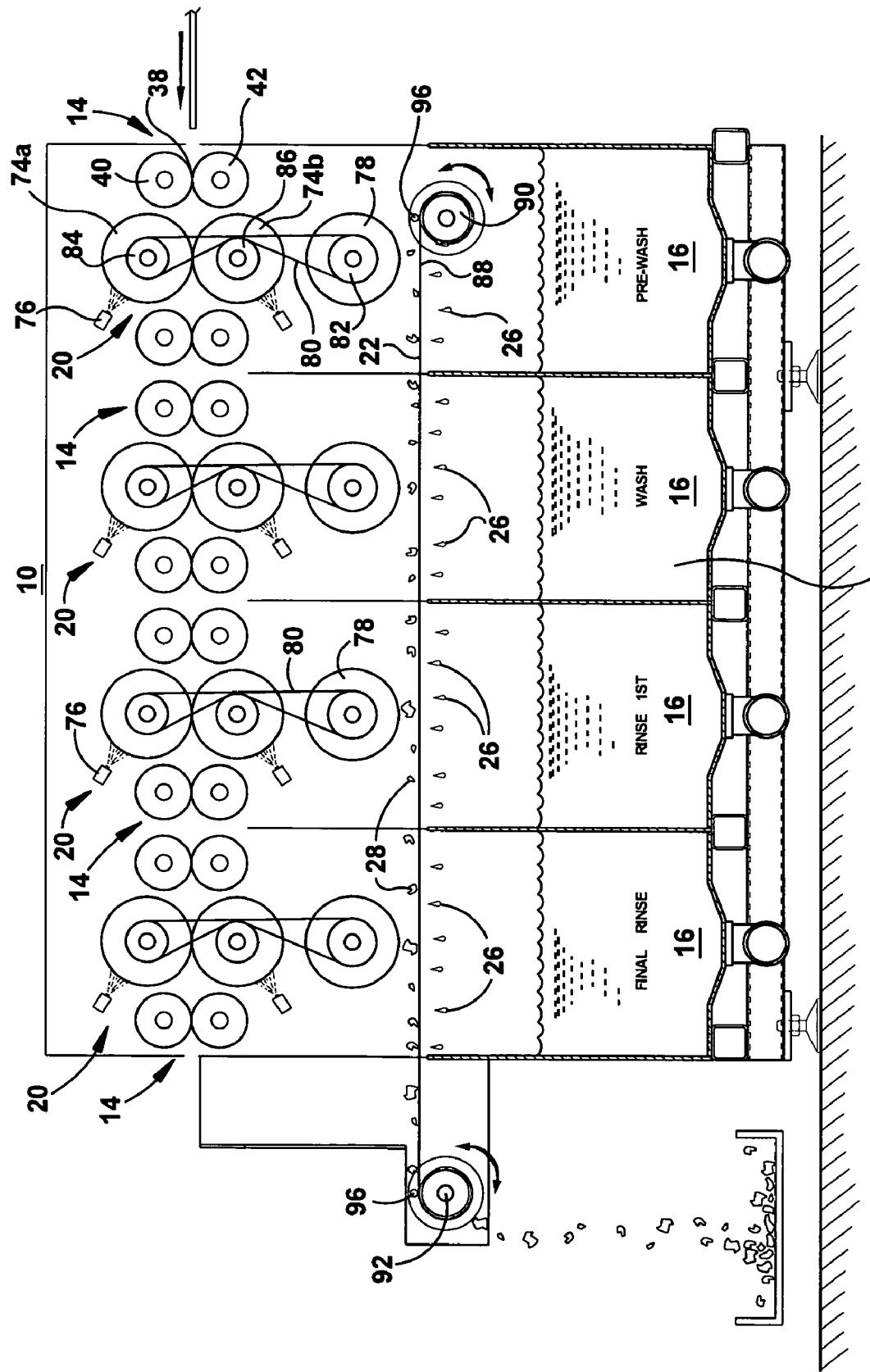
FIG. 5 is a schematic illustration of brush drives in a glass washing machine having a broken glass removal system.
Figure 14:
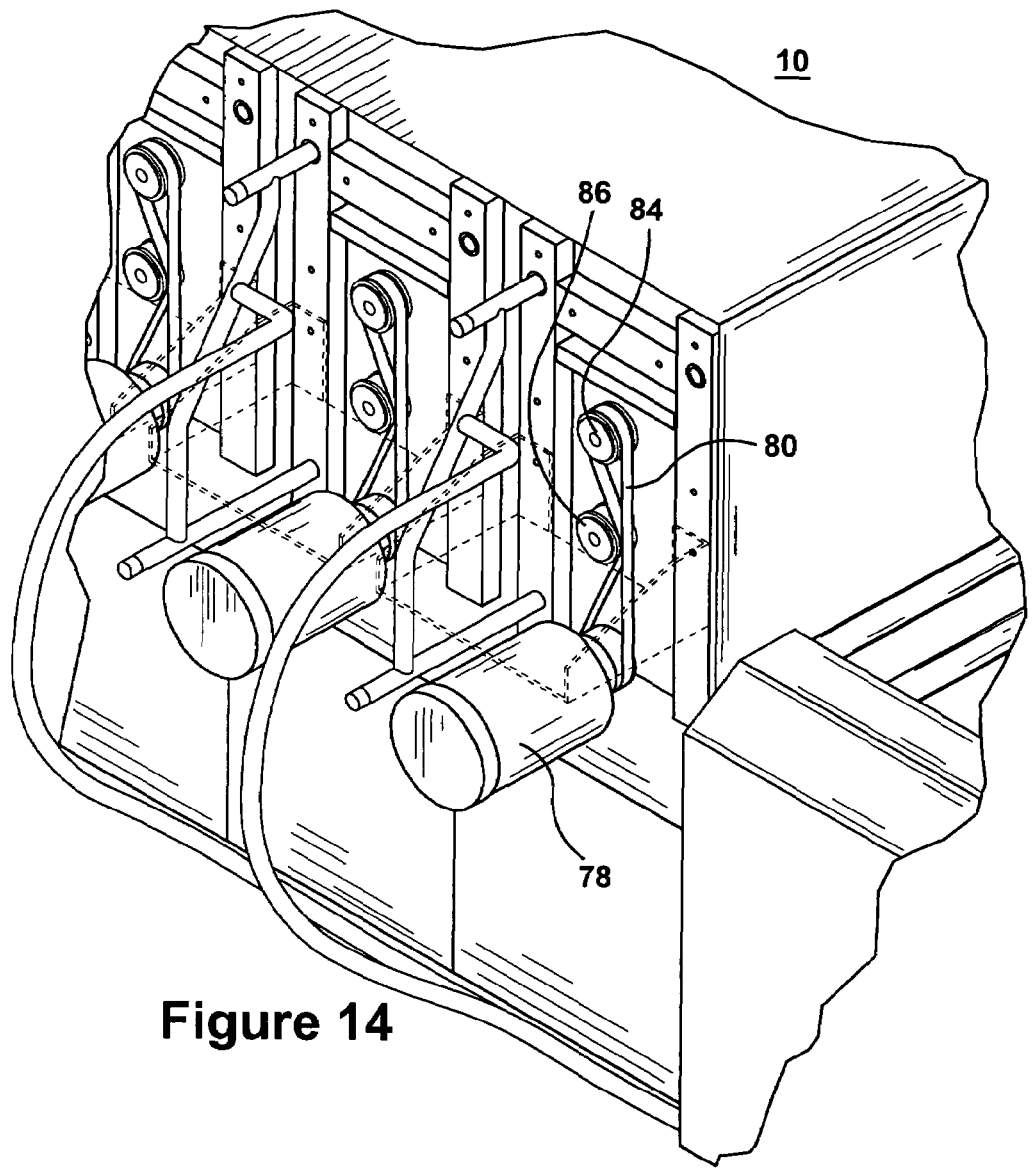
FIG. 14 shows drive trains of brushes and conduits to sprayers of a glass washing machine.
Figure 15:
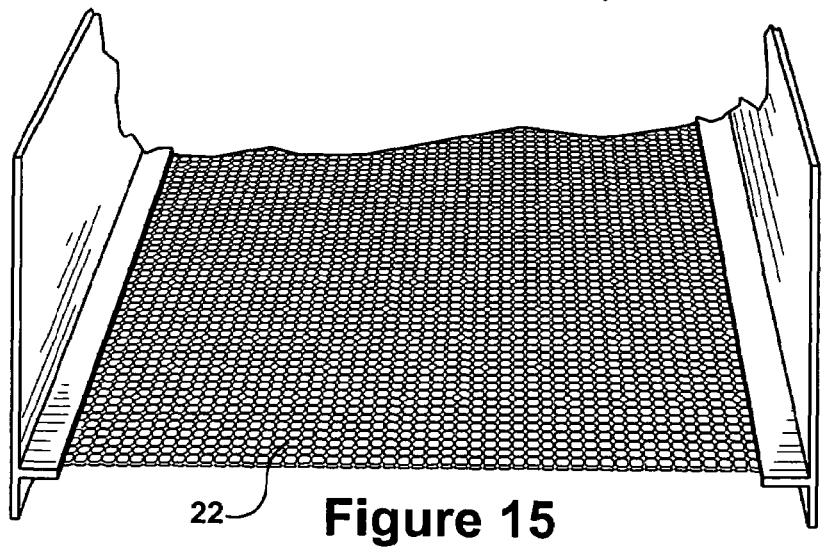
FIG. 15 illustrates a liquid permeable glass catching member.

FIG. 5 illustrates one way of driving the rotating brushes 74a, 74b. In the illustrated embodiment, a motor 78 positioned outside the washing machine 10 drives the brushes 74a, 74b (see FIG. 14). A belt 80 is positioned around a pulley 82 on the motor 78 and around a pulley 84 on an upper brush 74a. The belt engages a side of a pulley 86 on a lower brush 74b. In this configuration, rotation of the pulley 82 by the motor 78 in a clockwise direction will rotate the upper brush 74a in a clockwise direction and rotate the lower brush 74b in a counterclockwise direction. Similarly, if the pulley 82 is driven in a counterclockwise direction by the motor 78, the upper brush 74a is driven in a counterclockwise direction and the lower brush 74b is driven in a clockwise direction.

Figure 9:
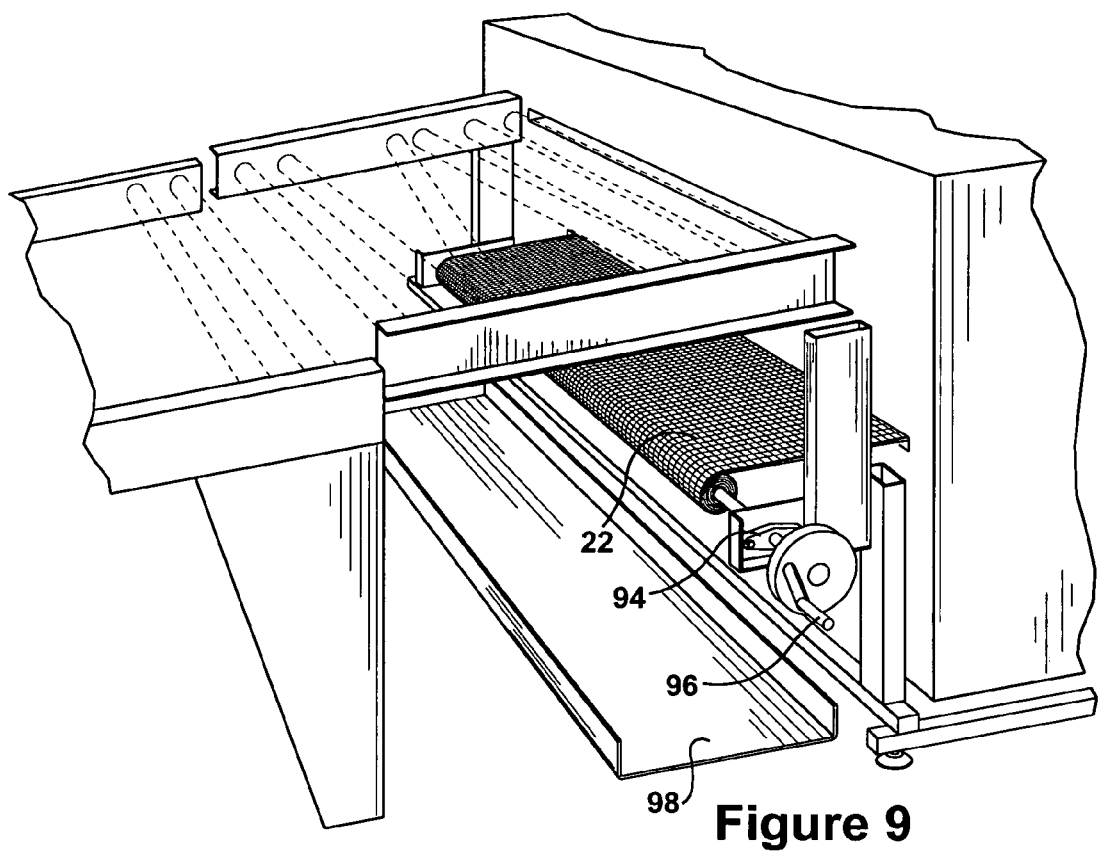
FIG. 9 illustrates an elongated glass catching member connected to a roller that is rotatable with a crank.
Figure 10:
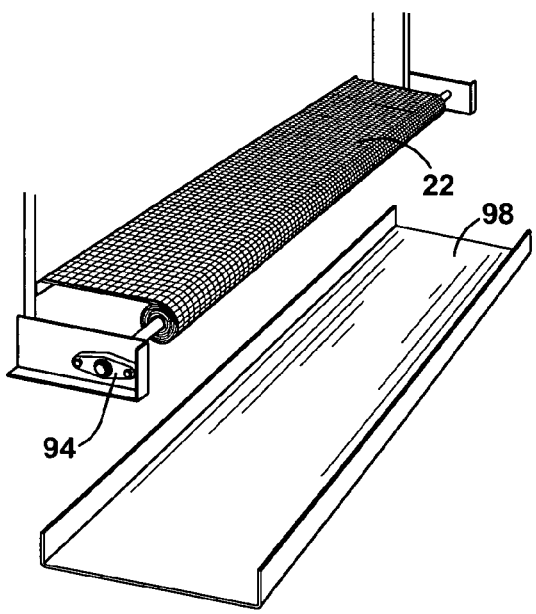
FIG. 10 illustrates an elongated glass catching member connected to a roller that is rotatable with a crank.
Figure 11:
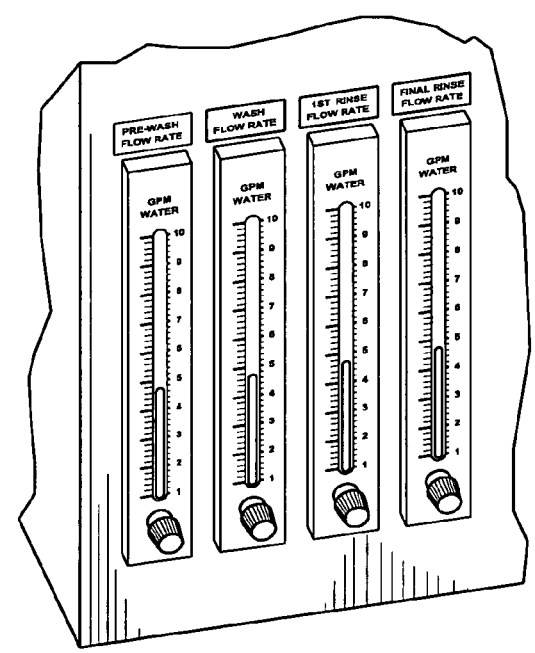
FIG. 11 illustrates flow valves of a glass washing machine.

Referring to FIGS. 1, 4 and 5, the liquid permeable glass catching web 22 is positioned between the lower brushes 74b and the reservoir 16 in the illustrated embodiment to catch pieces 28 of broken glass when a glass sheet 12 being washed breaks. In one embodiment, illustrated by FIGS. 1, 4, 5 and 8, the glass catching web is an elongated belt 88 supported by first and second rotatable rolls 90, 92. In the exemplary embodiment, the rotatable rolls 90, 92 are elongated shafts that extend across the entire width of the glass washing machine 10. In the exemplary embodiment, each rotatable roll 90, 92 is connected to the glass washing machine 10 by flange bearings 94 that allow rotation of the rotatable rolls 90, 92. In the embodiment illustrated by FIGS. 1, 4, 5 and 8, a crank 96 is mounted to an end of each of the rotatable rolls 90, 92 (see FIG. 9). In the illustrated embodiment, the rotatable rolls 90, 92 are spaced apart such that the elongated belt spans substantially all of the reservoirs 16 in the stations 30, 32, 34, 36. In one embodiment, illustrated in phantom in FIG. 1, the rotatable roll 90 is positioned above the reservoir 16 of the pre-wash station 30. The rotatable roll 90 may also be positioned outward of the glass washing machine 10 such that all of the reservoirs 16 are covered by the belt 80. For example, the rotatable roll may be mounted as illustrated at 90' of FIG. 1.

The rotatable roll 92 is positioned outside the glass washing machine 10 in the illustrated embodiment. In one embodiment, the elongated web or belt of liquid permeable material is longer than the distance between the first rotatable roll 90 and the second rotatable roll 92. The extra length of the belt 88 may be rolled onto the first rotatable roll 90 by turning the crank 96 on the first rotatable roll 90. The elongated belt 88 is maintained in this position until a glass sheet breaks and broken pieces 28 of glass fall onto the elongated belt 88. The elongated belt 88 inhibits broken pieces 28 of glass from falling into the reservoir 16. The crank 96 on the second rotatable roll 92 may be turned to roll the elongated belt 88 onto the second rotatable roll 92. As the elongated belt 88 is rolled onto the second rotatable roll 92, broken pieces of glass 28 on the elongated belt 88 are moved toward the second rotatable roll 92 and fall off the elongated belt 88 into a trough 98. In the exemplary embodiment, the length of elongated belt 88 that can be rolled onto the second rotatable roll 92 is as long or longer than the distance between the first and second rotatable rolls 90, 92 so that any glass that falls onto the elongated belt 88 can be removed from the glass washing machine 10 by rotating the crank 96 on the second rotatable roll 92. After the glass pieces 28 are removed from the elongated belt 88 by turning the crank 96 on the second rotatable roll 92, the crank 96 on the first rotatable roll 90 is turned to wind the elongated belt 88 back onto the first rotatable roll 90 so that pieces of the next glass sheet or plate that is broken can be removed by rotating the second rotatable roll 92.

Figure 7:
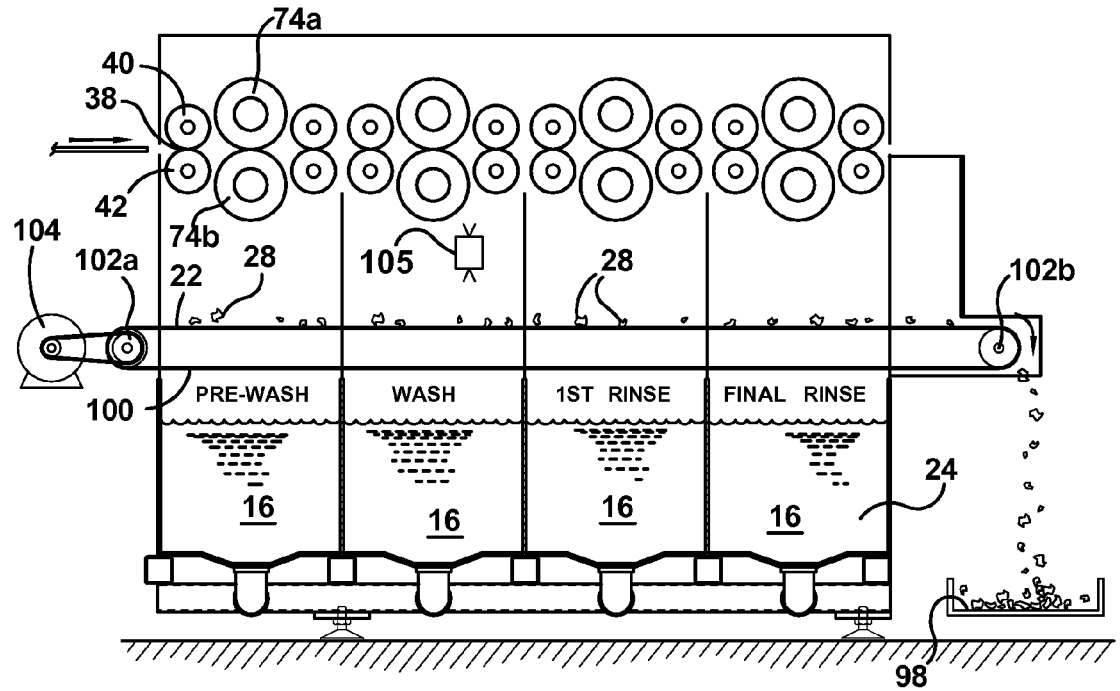
FIG. 7 is a schematic representation of a liquid permeable belt mounted on rollers above reservoirs of a glass washing machine;.
Figure 8:
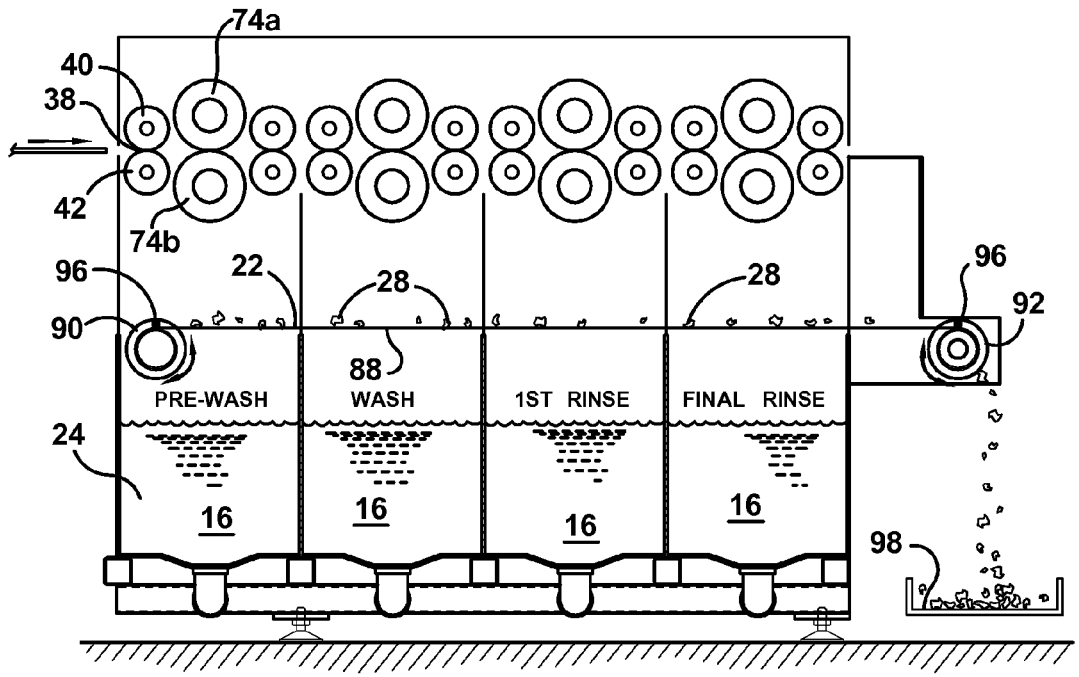
FIG. 8 is a schematic representation of an elongated glass catching member connected to rollers above reservoirs of a glass washing machine.

FIG. 7 illustrates a glass catching web 22 of a second embodiment. In this embodiment, the liquid permeable member 22 is a continuous liquid permeable belt 100 disposed around first and second rotatable rolls 102a 102b. Rotation of the rotatable rolls 102a, 102b moves the continuous belt 100 to remove broken pieces of glass 28 and drop the broken pieces of glass 28 into the trough 98. The rotatable rolls 102a, 102b may include a crank 96. In this embodiment, the glass washing machine operator turns the crank 96 when a glass sheet breaks to remove pieces of broken glass 28 from the glass washing machine 10. In one embodiment, the rotatable rolls 102a, 102b are coupled to a motor 104 that drives the rotatable roll 102a to remove broken pieces of glass 28. The motor 104 may be selectively turned on to remove broken pieces of glass 28 or may be run constantly so that any broken pieces of glass 28 are automatically removed. In one embodiment, a sensor 105 may be provided that determines when a glass sheet breaks and automatically turns the motor 104 on for a period of time to remove any broken pieces.

The illustrated glass catching web is a liquid permeable material. Suitable liquid permeable materials include a perforated rubber sheet and wire mesh.

In one embodiment, first and second air knives are positioned above and below the conveyor 38 near an exit of the glass washing machine for drying washed glass sheets or plates. One suitable air knife is described in U.S. patent application Ser. No. 10/352,010 entitled "Air Knife and Conveyor System," in the name of Robert Sheperd et al. owned by Glass Equipment Development, filed on Jan. 27, 2003, which claims priority from provisional patent application Ser. No. 60/365,500, filed Mar. 18, 2002 and is incorporated herein by reference in its entirety.

Although the present invention has been described with a degree of particularity, it is the intent that the invention include all modifications and alterations falling within the spirit and scope of the appended claims.

We claim:

1. A method of removing pieces of a broken glass sheet from a glass sheet washing machine, comprising:
   a) applying a fluid to a rotating brush;
   b) moving a glass sheet into contact with said rotating brush to wash said glass sheet;
   c) placing a fluid permeable belt between said rotating brush and a fluid container of said glass washing machine;
   d) communicating excess fluid applied to said brush through said fluid permeable belt to said container;
   e) catching pieces of a broken glass sheet with said fluid permeable belt to inhibit said pieces from entering said fluid container;
   f) moving by a controlled condition said fluid permeable belt to remove said broken glass pieces from said glass washing machine, the controlled condition comprising:
      i) monitoring the glass sheet for breaks during the movement of the glass sheet through the glass sheet washing machine; and
      ii) activating the motion of said liquid permeable belt for a prescribed period of time upon detecting a break in the glass sheet during the monitoring operation, the activating the motion of the liquid permeable belt for said prescribed period of time facilitates the removal of the broken glass from the surface of said liquid permeable belt.

2. The method of claim 1 wherein said liquid permeable belt is supported by first and second rotatable rolls, said rolls are rotated to move said liquid permeable belt to remove said broken pieces of glass from said glass washing machine.

3. The method of claim 1 wherein a first end of said liquid permeable belt is connected to a first rotatable roll and a second end of said liquid permeable belt is connected to a second rotatable roll, said rolls are rotated to move said liquid permeable belt and remove said broken pieces of glass from said glass washing machine.

4. The method of claim 1 wherein said liquid permeable belt is disposed around first and second rotatable rolls, said rolls are rotated to move said liquid permeable belt and remove said broken pieces of glass from said glass washing machine.

5. The method of claim 1 further comprising moving said liquid permeable belt to remove said broken pieces of glass and drop said broken pieces of glass into a trough disposed below said liquid permeable belt.

6. The method of claim 1 wherein the step of said moving said liquid permeable belt to remove said broken pieces of glass is achieved by coupling a mechanical assist to said liquid permeable belt.

7. The method of claim 6 wherein mechanical assist is a manual crank.

8. The method of claim 6 wherein the mechanical assist is a motor.

9. The method of claim 8 wherein the liquid permeable belt is continuously looped around first and second rotatable rolls.

10. The method of claim 8 further comprising moving said liquid permeable belt to remove said broken glass occurs only as a result of selectively enabling said motor.

11. A method of removing pieces of a broken glass sheet from a glass sheet washing machine, comprising:
   a) applying a fluid to a rotating brush;
   b) moving a glass sheet into contact with said rotating brush to wash said glass sheet;
   c) placing a fluid permeable belt between said rotating brush and a fluid container of said glass washing machine;
   d) communicating excess fluid applied to said brush through said belt to said container;
   e) catching pieces of a broken glass sheet with said liquid permeable belt to inhibit said pieces from entering said fluid container;
   f) moving said belt to remove said broken glass pieces from said glass washing machine; and
   g) providing first and second rotatable rolls that support said liquid permeable belt, said first and second rolls are rotated to move said liquid permeable belt to remove said broken pieces of glass from said glass washing machine, wherein said liquid permeable belt comprises a first end connected to said first rotatable roll and a second end connected to said second rotatable roll, the length of the liquid permeable belt between said first and second ends being longer than the distance between the first rotatable roll and the second rotatable roll and the extra length of said liquid permeable belt can be rolled onto said first or second rotatable roll to remove the broken glass from said glass washing machine.

12. The method of claim 11 further comprising the step of extending said first and second rotatable rolls such that said fluid permeable belt covers an outer perimeter of said fluid container.

13. The method of claim 12 further comprising the step of sensing the occurrence of a breaking of a glass sheet with a sensor.

14. The method of claim 13 wherein the step of moving the liquid permeable belt to remove said broken pieces of glass occurs as a result of said sensing the occurrence of a breaking of a glass sheet with said sensor.

15. The method of claim 11 wherein the step of said moving said liquid permeable belt to remove said broken pieces of glass is achieved by coupling a mechanical assist to said liquid permeable belt.

16. The method of claim 15 wherein the mechanical assist is a motor.

17. A method of removing pieces of a broken glass sheet from a glass sheet washing machine, comprising:
   a) applying a fluid to a rotating brush;
   b) moving a glass sheet into contact with said rotating brush to wash said glass sheet;
   c) placing a fluid permeable belt between said rotating brush and a fluid container of said glass washing machine;
   d) communicating excess fluid applied to said brush through said belt to said container;
   e) catching pieces of a broken glass sheet with said liquid permeable belt to inhibit said pieces from entering said fluid container;
   f) moving said belt to remove said broken glass pieces from said glass washing machine; and
   g) sensing an occurrence of a breaking of a glass sheet with a sensor such that said moving said belt to remove said broken glass pieces from said glass washing machine occurs only upon said sensing the occurrence of a breaking of a glass sheet.

18. The method of claim 17 wherein said moving said belt occurs for a prescribed period of time once said sensing an occurrence of a breaking of a glass sheet with a sensor is sensed, the prescribed period of time facilitates the removal of the broken glass from the surface of said belt.

19. The method of claim 18 wherein a first end of said liquid permeable belt is connected to a first rotatable roll and a second end of said liquid permeable belt is connected to a second rotatable roll, said rolls are rotated to move said liquid permeable belt and remove said broken pieces of glass from said glass washing machine.

20. The method of claim 17 wherein a first end of said liquid permeable belt is connected to a first rotatable roll and a second end of said liquid permeable belt is connected to a second rotatable roll, said rolls are rotated to move said liquid permeable belt and remove said broken pieces of glass from said glass washing machine.

* * * * *